D. T. HASTINGS.
WHEEL HUB.
APPLICATION FILED JULY 20, 1911.
1,088,700.
Patented Mar. 3, 1914.
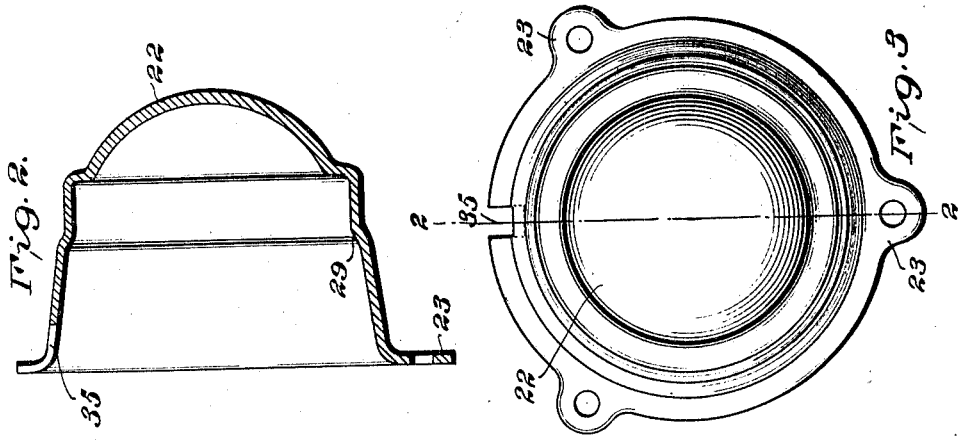
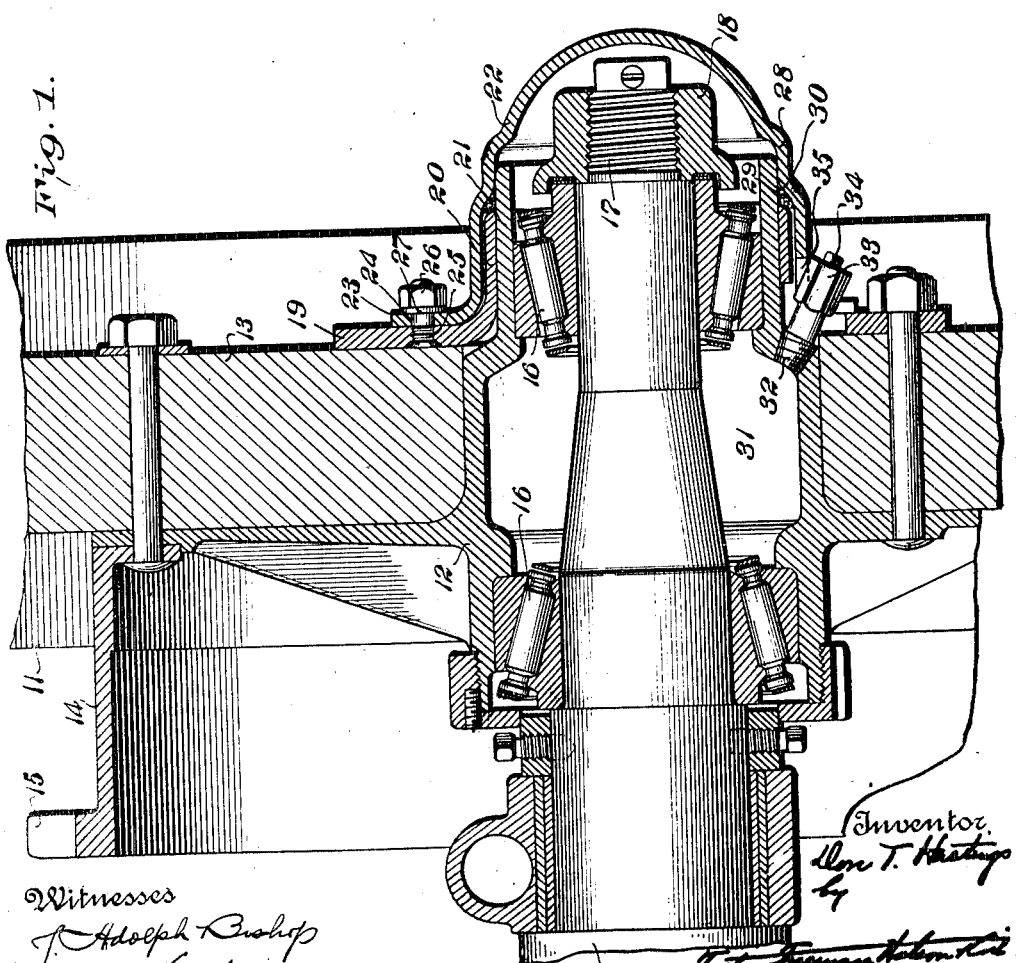
Witnesses
Adolph Bishop
B. M. Kent
Inventor
Don T. Hastings
by
Foster Freeman Watson & Co
Attorneys

UNITED STATES PATENT OFFICE.

DON T. HASTINGS, OF DETROIT, MICHIGAN, ASSIGNOR TO PACKARD MOTOR CAR COMPANY, OF DETROIT, MICHIGAN, A CORPORATION OF MICHIGAN.

WHEEL-HUB.

1,088,700. Specification of Letters Patent. Patented Mar. 3, 1914.

Application filed July 20, 1911. Serial No. 639,582.

*To all whom it may concern:*

Be it known that I, DON T. HASTINGS, a citizen of the United States, and resident of Detroit, Wayne county, State of Michigan, have invented certain new and useful Improvements in Wheel-Hubs, of which the following is a specification.

This invention relates to vehicle wheels and more particularly to improvements in the hub.

The objects of the invention are to provide a hub having a cap which is bolted to the wheel and which is provided with packing means to prevent dust and other foreign substances from entering the bearings of the wheel.

Other objects and the features of novelty will be apparent from the following description taken in connection with the drawings, in which, Figure 1 is a section of a wheel provided with my invention; Fig. 2 is a longitudinal section on the line 2—2, Fig. 3; Fig. 3 is a side view of the hub cap.

Referring to the drawings, 10 indicates a wheel axle and 11 a wheel mounted for rotation thereon. The wheel illustrated is one of the driving wheels of a motor vehicle and is shown as comprising a hub 12 to which are secured the spokes 13 and brake drum 14. The brake drum 14 has a driving sprocket 15 formed on one side thereof. Between the hub 12 and the axle 10 are provided roller bearings 16 and the end of the axle has a projecting threaded portion 17 carrying a nut 18 for holding the wheel in position on the axle. The outer face of the wheel is provided with a plate 19 which is bolted thereto and has a flange 20 projecting outwardly. The interior of the flange 20 engages the outer surface of the projecting portion 21 of the hub 12. Inclosing the end of the axle and the projecting end 21 of the hub and also the flange 20 of the plate 19 is a hub cap 22 which is dome-shaped and has radially projecting lugs 23 provided with openings 24 through which pass the bolts 25 for securing the cap to the wheel. The outer ends of the bolts 25 are provided with nuts 26 and lock washer 27.

It will be understood that instead of the radially projecting lugs 23 I may use a flange extending around the hub cap and provided with openings similar to the openings 24. The hub cap has a reduced portion 28 adjacent the outer end of the flange 20, whereby a shoulder 29 is formed, and between this shoulder and the outer end of the flange 20 I provide a packing material 30. It will be seen that this packing material prevents dust, water, and etc. from entering the bearings through the space between the hub cap and the hub. The hub 12 has an interior cavity 31 which is normally filled with a lubricating material for lubricating the bearings 16. In order to replenish the supply of lubricating material in the cavity 31 an opening 32 is provided on the outer side of the hub and this opening is provided with a tube 33, the outer end of which is closed by a removable plug 34. A notch 35 is provided in the hub cap to allow the tube 33 to extend therethrough, and it is made of the proper width to lock the tube 33 at the hexagon portion 33—A.

The hub cap may be conveniently and inexpensively manufactured by stamping the same from suitable sheet metal and the openings for the bolts and grease cup may be formed by punching, after the cap is stamped out. It will be noted that in this construction of the hub, the cap is rigidly secured to the wheel and the packing prevents dirt from entering the bearings, and by providing the bolts which secure the cap to the wheel with lock washers the cap is not liable to work loose and come off.

Having described the invention what is claimed and desired to be secured by Letters-Patent, is, 1. In combination with a wheel, an axle extending therethrough and projecting outwardly therefrom, an outwardly projecting flange on said wheel surrounding the projecting end of said axle, and a cap inclosing said flange and bolted to said wheel, said cap having a reduced portion adjacent the end of said flange.

2. In combination, a wheel, an axle extending therethrough and projecting outwardly therefrom, a flange on said wheel surrounding the projecting end of said axle, a cap inclosing said flange and bolted to said wheel and provided with a reduced portion forming a shoulder adjacent the end of said flange, and packing between the end of said flange and said shoulder.

3. A wheel comprising a hub, spokes radiating therefrom, a plate on the outer side of the wheel and rigidly secured to said hub, an outwardly projecting flange on said plate, and a cap secured to said plate and inclosing said flange.

4. A wheel comprising a hub, spokes radiating therefrom, a plate on the outer side of the wheel and rigidly secured to said hub, an outwardly projecting flange on said plate, a cap secured to said plate and inclosing said flange, and a lubricator communicating with the interior of said hub and extending through said plate and cap and locked in position by the cap.

5. A wheel comprising a hub, spokes radiating therefrom, a plate on the outer side of the wheel and rigidly secured to said hub, an outwardly projecting flange on said plate, a cap secured to said plate and inclosing said flange and provided with a circumferential shoulder adjacent the end of said flange, and packing arranged between said shoulder and the end of said flange.

6. A wheel comprising a hub having an outward extension, spokes radiating from said hub, said extension projecting beyond the outer face of said spokes, a plate on the outer side of the wheel and rigidly secured to said hub, an outwardly projecting flange on said plate surrounding said hub extension, a cap secured to said plate and inclosing said flange and said hub extension and provided with a circumferential shoulder adjacent the end of said flange, and packing surrounding said hub extension and arranged between said shoulder and the end of said flange.

In testimony whereof I affix my signature in presence of two witnesses.

DON T. HASTINGS.

Witnesses:
W. H. FINCKEL, Jr.,
E. A. KIEHNE.